(12) United States Patent
Kamiyama

(10) Patent No.: US 10,722,790 B2
(45) Date of Patent: Jul. 28, 2020

(54) RENDERING SYSTEM, CONTROL METHOD, AND STORAGE MEDIUM

(71) Applicant: SQUARE ENIX CO., LTD., Tokyo (JP)

(72) Inventor: Mitsuru Kamiyama, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 1059 days.

(21) Appl. No.: 15/185,350

(22) Filed: Jun. 17, 2016

(65) Prior Publication Data

US 2016/0296842 A1   Oct. 13, 2016

Related U.S. Application Data

(63) Continuation of application No. PCT/JP2013/007657, filed on Dec. 26, 2013.

(51) Int. Cl.
*A63F 9/24* (2006.01)
*A63F 13/355* (2014.01)
(Continued)

(52) U.S. Cl.
CPC .......... *A63F 13/355* (2014.09); *A63F 13/335* (2014.09); *A63F 13/352* (2014.09);
(Continued)

(58) Field of Classification Search
CPC .... A63F 13/355; A63F 13/358; A63F 13/335; A63F 13/352; A63F 13/77; A63F 13/52
See application file for complete search history.

(56) References Cited

U.S. PATENT DOCUMENTS

| 7,783,695 B1 * | 8/2010 | Tyrrell, III | ............ G06F 9/5055 345/473 |
| 8,606,942 B2 * | 12/2013 | Perlman | .................. A63F 13/35 709/229 |

(Continued)

FOREIGN PATENT DOCUMENTS

| JP | 2012-245347 | 12/2012 |
| WO | 2009/138878 | 11/2009 |
| WO | 2013/153787 | 10/2013 |

OTHER PUBLICATIONS

International Search Report (ISR) from International Searching Authority (Japan Patent Office) in International Pat. Appl. No. PCT/JP2013/007657, dated Jan. 28, 2014.
(Continued)

*Primary Examiner* — Dmitry Suhol
*Assistant Examiner* — Carl V Larsen
(74) *Attorney, Agent, or Firm* — Greenblum & Bernstein, P.L.C.

(57) ABSTRACT

A command server outputs information related to a screen rendering command and transmission destination information to a rendering server, in which at least some of rendering resources required when performing rendering of a screen in accordance with the information related to the rendering command are loaded, among a plurality of rendering servers associated with the command server. Then, the rendering server reads the rendering resources from the required rendering resources that are still not loaded to load them into the loading region to hold them, performs the rendering of the screen based on the information related to the rendering command, and transmits it to a target client terminal.

17 Claims, 10 Drawing Sheets

(51) Int. Cl.
*A63F 13/77* (2014.01)
*A63F 13/358* (2014.01)
*A63F 13/335* (2014.01)
*A63F 13/352* (2014.01)
*A63F 13/52* (2014.01)

(52) U.S. Cl.
CPC ............ *A63F 13/358* (2014.09); *A63F 13/52* (2014.09); *A63F 13/77* (2014.09)

(56) References Cited

U.S. PATENT DOCUMENTS

| | | | | |
|---|---|---|---|---|
| 2010/0167809 | A1* | 7/2010 | Perlman | H04N 21/2343 463/24 |
| 2011/0122063 | A1 | 5/2011 | Perlman et al. | |
| 2011/0212783 | A1* | 9/2011 | Dale | H04L 67/1002 463/42 |
| 2011/0281645 | A1* | 11/2011 | Wolfson | A63F 13/355 463/31 |
| 2012/0283018 | A1 | 11/2012 | Berner et al. | |
| 2012/0299938 | A1 | 11/2012 | Iwasaki | |
| 2013/0210526 | A1* | 8/2013 | Kim | H04L 67/1002 463/42 |
| 2013/0254261 | A1* | 9/2013 | Nicholls | G06F 9/5027 709/203 |
| 2013/0254417 | A1* | 9/2013 | Nicholls | G06F 9/5027 709/231 |
| 2013/0297770 | A1* | 11/2013 | Zhang | G06F 9/505 709/224 |
| 2014/0168226 | A1 | 6/2014 | Iwasaki | |
| 2017/0024259 | A1* | 1/2017 | Mecklin | G06F 9/5044 |
| 2018/0288133 | A1* | 10/2018 | Colenbrander | H04L 67/42 |

OTHER PUBLICATIONS

Partial Supplementary European Search Report from European Patent Office (EPO) in European Patent Appl. No. 13900541.7, dated Jul. 14, 2017.

Ian J. Grimstead et al., "Automatic Distribution of Rendering Workloads in a Grid Enabled Collaborative Visualization Environment," Supercomputing, 2004. Proceedings of the ACM/IEEE SC2004 Conference Pittsburgh, PA, USA Nov. 6-12, 2004, Piscataway, NJ, USA, IEEE, 1730 Massachusetts Ave., NW Washington, DC 20036-1992 USA, Nov. 6, 2004 (Nov. 6, 2004), p. 1, XP058095906.

Office Action from European Patent Office (EPO) in European Patent Appl. No. 13900541.7, dated Sep. 11, 2018.

Anonymous: "Cloud gaming—Wikipedia", Dec. 16, 2013.

* cited by examiner

FIG. 5

| COMMAND ID | OBJECT ID | OTHER INFORMATION |

RENDERING SYSTEM, CONTROL METHOD, AND STORAGE MEDIUM

This application is a continuation of International Patent Application No. PCT/JP2013/007657 filed on Dec. 26, 2013, the entire content of which is incorporated herein by reference.

BACKGROUND OF THE INVENTION

Field of the Invention

The present invention relates to a rendering system, a control method, and a storage medium, and in particular a technique for providing screens rendered on a server side to a client terminal.

Description of the Related Art

Due to the development of communication technology in recent years, various service provision using communication over networks such as the Internet is performed. A user can receive data for such a service from a server via a network by causing a client terminal such as a PC or a cellular phone to connect to the server. For example, it is possible for a user to receive provision of highly entertaining content such as a so-called network game.

One type of network game is a multiple simultaneous participant type network game such as an MMORPG (Massively Multiplayer Online Role-Playing Game). In a multiple simultaneous participant type network game, a user, by causing a client terminal that he uses to connect to a server that provides a game, can perform cooperative play and head-to-head play with a user that uses a client terminal connected to that server device.

In typical multiplayer network games, the client terminal performs transmission/reception of data required for processing in relation to the game with the server, and, based on received data, renders game screens and displays them on a connected display apparatus. Specifically, information, such as an operation input performed in a client terminal, is transmitted from the client terminal to the server, and is used in processing such as for updating a state of each participating user managed in the server. Also, data required for rendering a game screen, such as text data of a chat or a status such as a location of a rendering character generated by processing such as for updating a state, is transmitted to the client terminal from the server. By rendered game screens being displayed, a user can play the network game.

However, in such network games that perform rendering processing on the client terminal, there are those that require that the client terminal have sufficient rendering capabilities. For example, for the execution of a game that provides game screens in which beautiful graphics are represented such as photorealistic 3D graphics, sufficient rendering capabilities are required. Specifically, it is required that a rendering chip that the client terminal is provided with has calculation capabilities in order to execute necessary rendering calculations to perform rendering of game screens, and that there is a GPU memory for loading resource data such as textures used in beautiful graphics to begin with. However, rendering hardware having such high rendering calculation capabilities and large capacity GPU memory is expensive, and of course users who own these are limited. Consequently, this is a hurdle to users starting to use such network game services, and there is the possibility that it will be difficult to increase the number of users of the services as a result.

Meanwhile, as a technique for performing a new service provision due to the development of communication technology, there is a technique in which a server performs game screen rendering, and game screens are provided to client terminals from the server. A technique of a so-called cloud-type network game service that transmits game screens rendered on a server to a client terminal in a streaming format is disclosed in PTL1. According to this kind of game service, it is possible to provide game screens, in which beautiful graphics are represented, to a user regardless of the rendering capabilities on the client terminal that the user uses. That is, if the client terminal merely has the capabilities to receive game screens transmitted in the streaming format via the network, and to display them on a display apparatus, and the capabilities to transmit information of operation input performed on the client terminal to the server, it is possible to receive the provision of a game service without incurring the installation cost of a dedicated device.

CITATION LIST

Patent Literature

[PTL1] International Publication No. 2009/138878 specification

SUMMARY OF INVENTION

Technical Problem

In a network game service such as in PTL1, performing generation and transmission of game screens simultaneously for a plurality of client terminals that use the service simultaneously is considered. For this reason, an implementation in which a plurality of rendering servers are arranged to generate game screens that are transmitted to the client terminal can be considered. That is, one rendering server which is assigned to the least number of terminals, for example, among the plurality of rendering servers is assigned for each client terminal that performs screen transmission requests to the server, and it performs rendering of game screens transmitted to that client terminal.

However, for rendered game screens, a calculation amount required for rendering processing differs depending on the type of the game, the scene in the game that is rendered, user settings, and the like. Accordingly, in a conventional approach such as where assignment is performed simply in accordance with the number of terminals that are connected, optimization of calculation resources of the rendering servers is not considered at all, and therefore processing delays may occur in a rendering server assigned to many rendering processes related to client terminals requesting game screens for which the calculation amount is large, for example. That is, rendering server assignment to client terminals has not been performed based on the perspective of optimization of rendering processing thus far.

The present invention was conceived in view of the above described problem, and it is an object to provide a rendering system, a control method, and a storage medium that decrease a calculation amount of rendering processing for screens transmitted to the client terminal suitably.

Means for Solving the Problem

To achieve the foregoing object, a rendering system according to one embodiment of the present invention is being equipped with the following configuration. Specifically, a rendering system having a command server that, based on information received from a client terminal, outputs information related to a rendering command for a screen, and rendering servers that perform rendering of the screen in accordance with the information related to the rendering command received from the command server and transmit it to the client terminal, wherein the command server comprises: a request receiver which is able to receive a screen transmission request from a target client terminal; a generator which is able to generate the information related to the rendering command by executing calculation processing related to a screen to be provided to the target client terminal; and an outputter which is able to output transmission destination information that indicates the target client terminal, which is a transmission destination of the screen and the information related to the rendering command, to, out of a plurality of the rendering servers which are associated with the command server, a rendering server that has loaded at least some of rendering resources necessary when performing rendering of a screen in accordance with the information related to the rendering command, and the rendering server comprises: a storage which is able to store rendering resources to use in rendering of a screen; a loader which is able to read from the storage, load into a loading region, and hold a rendering resource, out of necessary rendering resources, that is not yet loaded, based on the information related to the rendering command outputted by the outputter; a renderer which is able to perform, by using the rendering resource held in the loading region, rendering of a screen based on the information related to the rendering command; and a screen transmitter which is able to transmit the screen rendered by the renderer to the target client terminal based on the transmission destination information.

To achieve the foregoing object, a rendering system according to another embodiment of the present invention is being equipped with the following configuration. Specifically, a rendering system having a command server that, based on information received from a client terminal, outputs information related to a rendering command for a screen, rendering servers that perform rendering of a screen in accordance with the information related to the rendering command, and transmit it to a client terminal, and a relay apparatus that transmits to the rendering servers information related to the rendering command received from the command server, wherein the command server comprises: a request receiver which is able to receive a screen transmission request from a target client terminal; a generator which is able to generate the information related to the rendering command by executing calculation processing related to a screen to be provided to the target client terminal; a specifier which is able to specify a region in which the target client terminal is present; and an outputter which is able to output transmission destination information that indicates the target client terminal, which is a transmission destination of the screen, and information related to the rendering command generated by the generator to the relay apparatus, which is present in a region corresponding to the region specified by the specifier, the relay apparatus comprising: a command receiver which is able to receive the transmission destination information and the information related to the rendering command output by the outputter; and a transmitter which is able to transmit, with referring to the information related to the rendering command, the transmission destination information and the information related to the rendering command to, out of a plurality of the rendering servers which are associated with the relay apparatus, a rendering server that has loaded at least some of the rendering resources necessary when performing rendering of a screen in accordance with the information related to the rendering command, and the rendering server comprises: a storage which is able to store rendering resources to use in rendering of a screen; a loader which is able to read from the storage, load into a loading region, and hold a rendering resource, out of necessary rendering resources, that is not yet loaded, based on the information related to the rendering command transmitted by the transmitter; a renderer which is able to perform, by using the rendering resource held in the loading region, rendering of a screen based on the information related to the rendering command; and a screen transmitter which is able to transmit the screen rendered by the renderer to the target client terminal based on the transmission destination information.

Advantageous Effects of Invention

By virtue of the present invention according to this kind of configuration, it becomes possible to suitably decrease a calculation amount of rendering processing for screens transmitted to the client terminal.

Further features of the present invention will become apparent from the following description of exemplary embodiments (with reference to the attached drawings). Note, in the attached drawings, the same reference numerals are added for same or similar configurations.

BRIEF DESCRIPTION OF THE DRAWINGS

The attached drawings, which are incorporated in and constitute a part of the specification, illustrate embodiments of the invention and, together with the description, serve to explain the principles of the invention.

FIG. 5 is a view for explaining information related to a rendering command according to embodiments of the present invention.

DESCRIPTION OF THE EMBODIMENTS

First Embodiment

Exemplary embodiments of the present invention will be explained hereinafter in detail, with reference to the drawings. The embodiments explained below explain an example in which the present invention is applied to a game system in which game screens are rendered in accordance with screen requests received from a client terminal via a network, and obtained game screens are transmitted to a client terminal in a streaming format via a network as an example of a rendering system. However, the present invention is not limited to games, and is also applicable to any device and system capable of performing rendering of a screen according to a request from a client terminal and transmitting an obtained screen to the client terminal.

<Rendering System Configuration>

Figure 1:
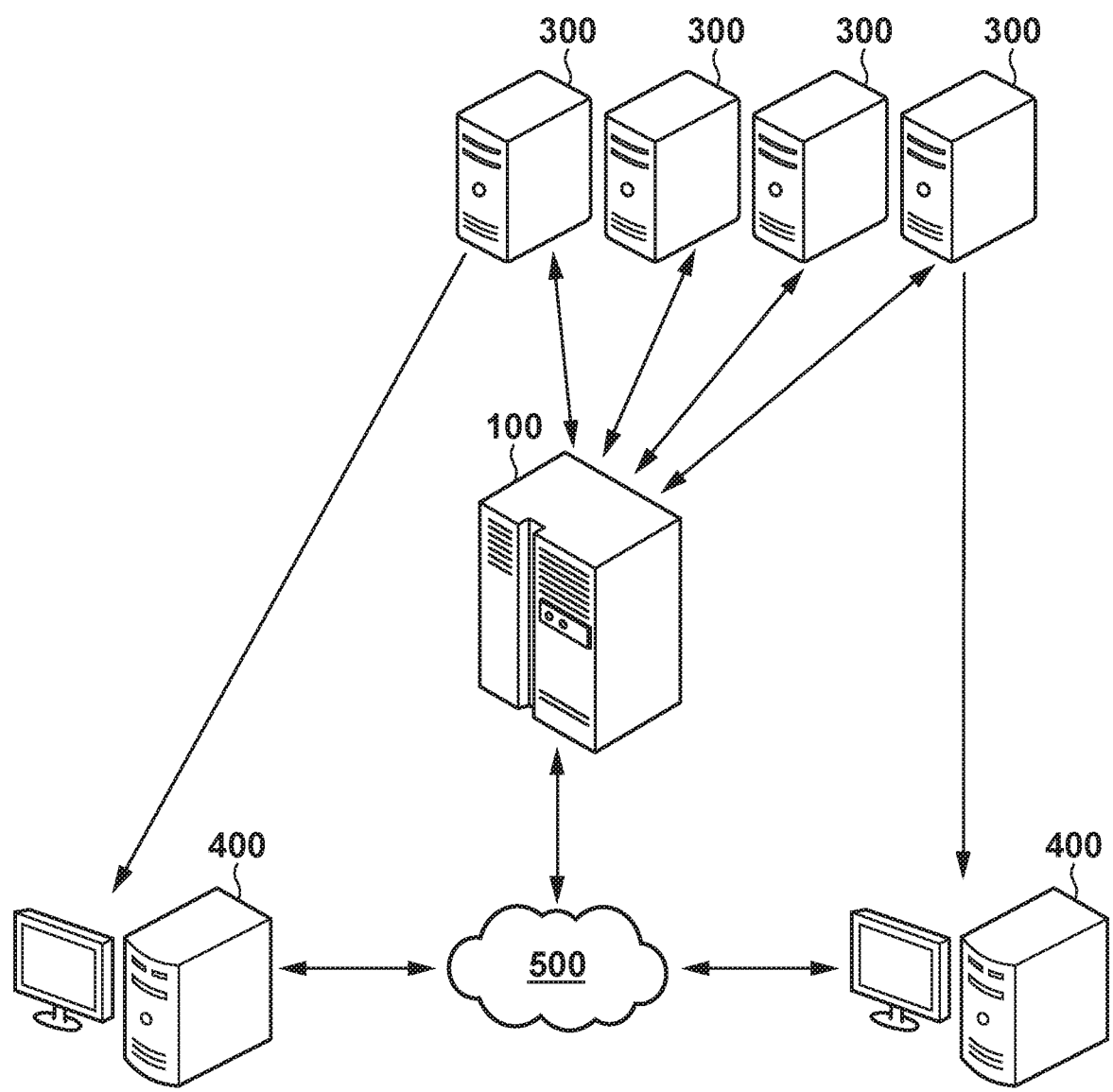
FIG. 1 is a view for illustrating a system configuration of a rendering system according to a first embodiment of the present invention.

FIG. 1 is a view for illustrating a system configuration of a rendering system according to a first embodiment of the present invention. The rendering system of this embodiment renders a game screen in response to a request received from each client terminal 400 and transmits it to the respective client terminal 400.

Firstly, when a request for provision of a game screen is made to a command server 100 via a network 500 from a client terminal 400 by an operation of a user or the like, the command server 100 executes the calculation processing related to the provided game screen, and generates information related to a rendering command for the game screen.

Also, a plurality of rendering servers 300 are connected to the command server 100, and the command server 100 assigns one rendering server 300 out of these to be a server that performs processing for rendering game screens for one of the client terminals 400 from which it receives a request for provision of game screens. The command server 100 and the rendering servers 300 may be connected via the network 500 in the same way as the command server 100 and the client terminals 400, and the command server 100 and the rendering servers 300 may be connected within a particular local network.

Detailed processing of the rendering servers 300 is described later, and in each of the rendering servers 300, rendering resources necessary for the generation of game screens (a rendering program that implements model data, texture data, screen effects or the like) are stored, and rendering of game screens is performed in the rendering servers 300 by loading these resources and using them.

Below, block diagrams are illustrated to explain a functional configuration for each apparatus of the game system of this embodiment that this kind of system configuration has. In the following explanation, similar hardware used in a plurality of apparatuses is explained adding the prefixes "command" and "rendering" respectively for the command server 100 and the rendering server 300 in order to distinguish the hardware between apparatuses. However, these prefixes are simply added in order to distinguish the hardware between the apparatuses, and these are not used in order to specify the function or operation of the hardware in the description of this embodiment.

<Configuration of the Command Server 100>

Figure 2:
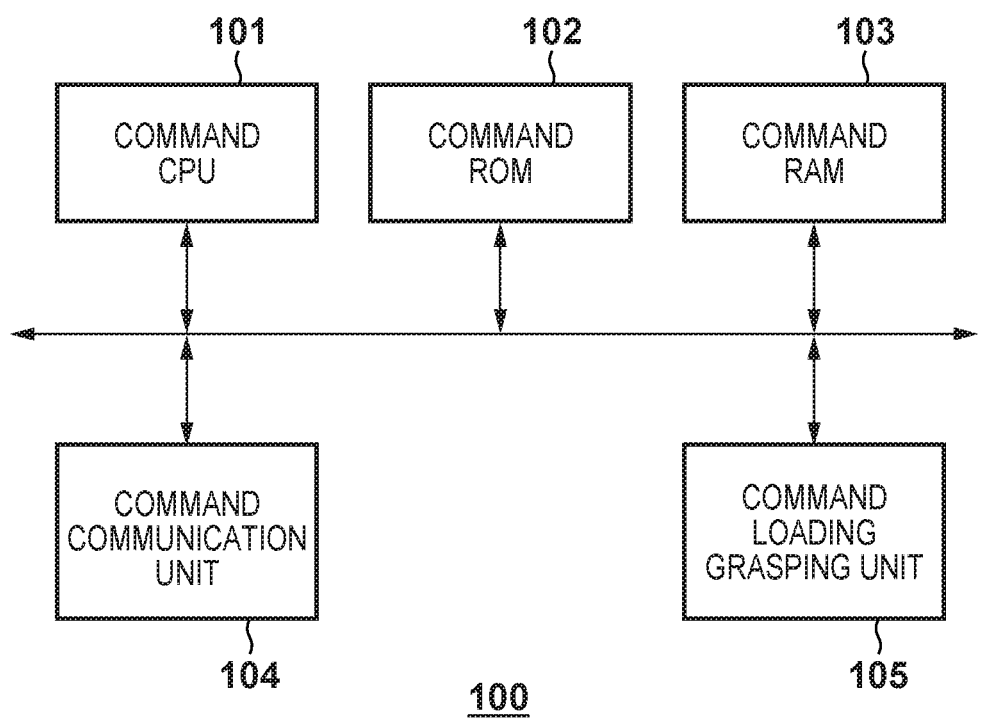
FIG. 2 is a view for illustrating a functional configuration of a command server 100 according to the first embodiment of the present invention.

FIG. 2 is a block diagram for illustrating a functional configuration of the command server 100 according to the rendering system of this embodiment.

A command CPU 101 controls operation of each block that the command server 100 has. Specifically, the command CPU 101 controls operation of each block by reading a program such as an operation program or an application of each block stored in a command ROM 102, loading it into a command RAM 103, and executing it. Also, the command CPU 101 executes necessary calculation processing for a game for which screens are provided to the client terminal 400, to generate information related to a rendering command instructing rendering of a game screen.

The command ROM 102 is a storage apparatus that stores data permanently, such as a non-volatile memory for example. The command ROM 102 stores not only an operation program of each block that the command server 100 has, but also information such as parameters used in operation of each block. Also, the command RAM 103 is a volatile memory. The command RAM 103 is used not only as a loading region for operation programs of each block, but also as a storage region for intermediate data outputted in the operation of each block, or as a work region for performing processing of each block.

A command communication unit 104 is an interface for communication with an external apparatus that the command server 100 has. In the present embodiment, the command communication unit 104 receives screen transmission requests from the client terminals 400, and information of operation input performed on the client terminals 400. Also, the command communication unit 104 receives information of rendering resources loaded into a GPU memory 306 of a rendering server 300 from each of the rendering servers 300 connected to the command server 100. Also, the command communication unit 104 transmits information related to a generated rendering command, and information (transmission destination information) for specifying the client terminal 400 which is the transmission destination of the game screens to the rendering server 300 that is caused to perform generation and transmission of the game screens for the client terminal 400.

A command loading grasping unit 105 manages information of rendering resources loaded into the GPU memory 306 that is received from each of the connected rendering servers 300 in association with identification information of the respective rendering server 300. In the present embodiment, for a game screen that is rendered in accordance with a rendering command, the command CPU 101 assigns rendering of the game screen to a rendering server 300 for which a rendering resource that is used is already loaded into the GPU memory 306. This is based on an attempt to optimize rendering processing by reusing the rendering resource loaded into the GPU memory 306.

A rendering resource used for rendering a game screen is stored in a typical storage apparatus such as an HDD, a game software ROM or the like, but such storage apparatuses are unsuitable for frequent access, and performance of a data reading from the storage apparatus upon every rendering process is inefficient. Accordingly, rendering resources are normally read from the storage apparatus, loaded into a loading region of the GPU memory 306 or the like, and maintained such that high speed data access is possible. The GPU memory 306 is configured so that high-speed access from a later described GPU 305 is possible, and therefore it is possible to optimize rendering processing by the GPU 305 by the loaded rendering resources being used for rendering processing. In general, it can be said that while play is performed in the same scene in game progress, changes in the distribution of rendering objects included in game screens are small in consecutive frames. That is, if rendering resources are already loaded into the GPU memory 306 in rendering processing for a previous frame, for example, there is a high possibility that reuse of the rendering resources is possible in rendering processing for the next frame. Also, in a case where a service provision is performed such that a plurality of client terminals 400 can play the same game content such as in the rendering system of this embodiment in particular, there is the possibility that transmission of game screens for the same scene to a plurality of client terminals 400 is performed. In such a case, the possibility that rendering resources that are once loaded into the GPU memory 306 can be reused is high. That is, it is possible to attempt an optimization by assigning rendering of game screens such as those that use the same rendering resources to the same rendering server 300.

Specifically, the command loading grasping unit 105 outputs information that specifies the rendering server 300 for which a requested rendering resource is loaded into the GPU memory 306 based on information that it manages. Then, the command CPU 101 can attempt an optimization of game screen rendering in the rendering system by deciding the rendering server 300 based on the outputted information.

In the present embodiment, explanation is given having information of rendering resources that are loaded into the GPU memory 306 be transmitted to the command server 100 from the rendering server 300, and having the command loading grasping unit 105 specify a rendering server 300 in which a rendering resource corresponding to the rendering command is already loaded based on this information, but implementation of the present invention is not limited to this. For example, in a case where the rendering server 300 that performs loading into the GPU memory 306 for each rendering resource used for the generation of a game screen, such as texture data having a particularly large data amount, is determined in advance in relation to the plurality of rendering servers 300 that are connected, it is not necessary that information of the loaded rendering resources be transmitted to the command server 100. In such a case, the command CPU 101 may decide a rendering server 300 to which to transmit information related to a rendering command based on information of the rendering server 300 determined in advance. For example, the command CPU 101 may obtain scene information related to a game screen that is generated from information related to a rendering command, and assign rendering of the game screen to a rendering server 300 for which loading of a rendering resource corresponding to that scene is assigned in advance.

<Configuration of the Rendering Servers 300>

Figure 3:
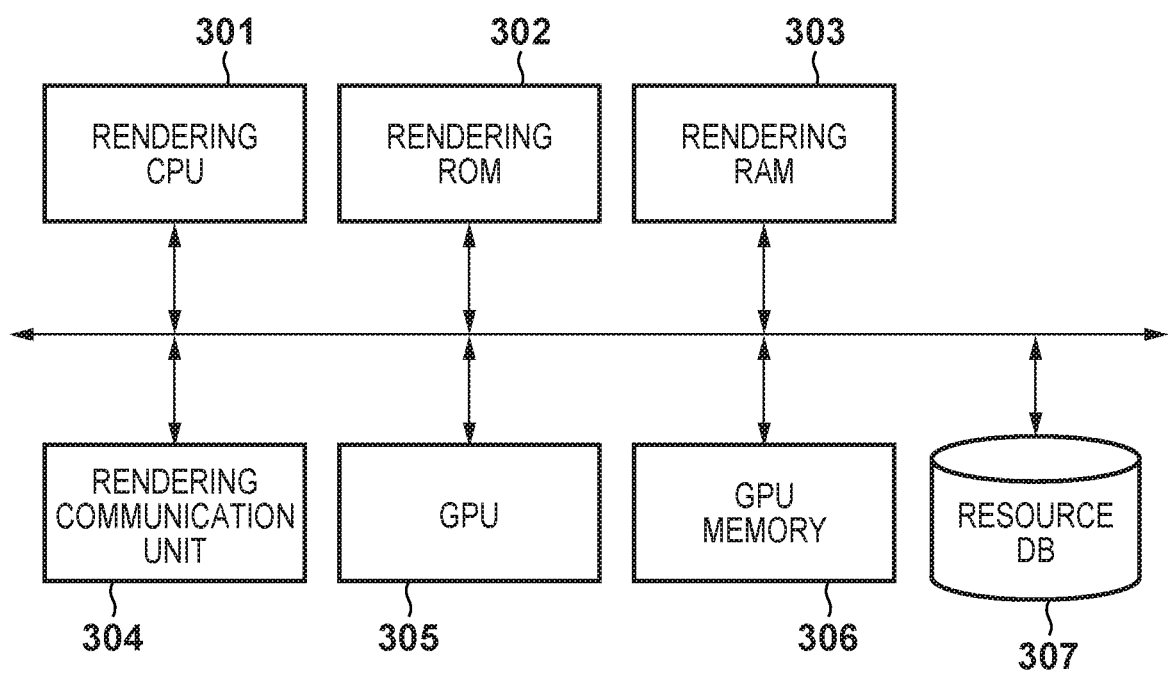
FIG. 3 is a view for illustrating a functional configuration of a rendering server 300 according to embodiments of the present invention.

FIG. 3 is a block diagram for illustrating a functional configuration of the rendering servers 300 according to the rendering system of this embodiment.

A rendering CPU 301 controls operation of each block that the rendering server 300 has. Specifically, the rendering CPU 301 controls operation of each block by reading an operation program of the respective block that is stored in a rendering ROM 302, loading it into a rendering RAM 303, and executing it.

The rendering ROM 302 is a storage apparatus that stores data permanently, such as a non-volatile memory for example. The rendering ROM 302 stores not only an operation program of each block that the rendering server 300 has, but also information such as parameters required in operation of each block. Also, the rendering RAM 303 is a volatile memory. The rendering RAM 303 is used not only as a loading region for operation programs of each block, but also as a storage region for intermediate data outputted in the operation of each block, or as a work region for performing processing of each block.

A rendering communication unit 304 is an interface for communication with an external apparatus that the rendering server 300 has. In the present embodiment, the rendering communication unit 304 receives transmission destination information, and information related to a rendering command from the command server 100. Also, the rendering communication unit 304 transmits game screens, rendered based on information related to rendering commands, in a streaming format to the client terminal 400 specified by the transmission destination information.

The GPU 305 performs rendering of a game screen in accordance with a rendering command generated by information related to a received rendering command. Specifically, the rendering CPU 301 generates a rendering command related to rendering of a game screen from information related to a rendering command, and transfers it to the GPU 305. Also, the rendering CPU 301 references information of a rendering resource necessary for generation of a game screen included in the information related to the rendering command, and in a case where a rendering resource that is still not loaded into the GPU memory 306 is included, reads that resource from a resource DB 307 to load it into the GPU memory 306. Then, the GPU 305 performs rendering of a game screen by using a resource loaded into the GPU memory 306 in accordance with the transferred rendering command. The GPU 305 of this embodiment encodes obtained game screens in a predetermined encoding format corresponding to the streaming format, generates the video data and outputs it.

The GPU memory 306 is a work region, such as a DRAM, for example, that is used in rendering processing, and arranged to enable the GPU 305 and the rendering CPU 301 to access it. Also, the resource DB 307 is a storage apparatus such as an HDD, for example, and rendering resource data is stored therein.

<Screen Provision Processing>

Figure 4:
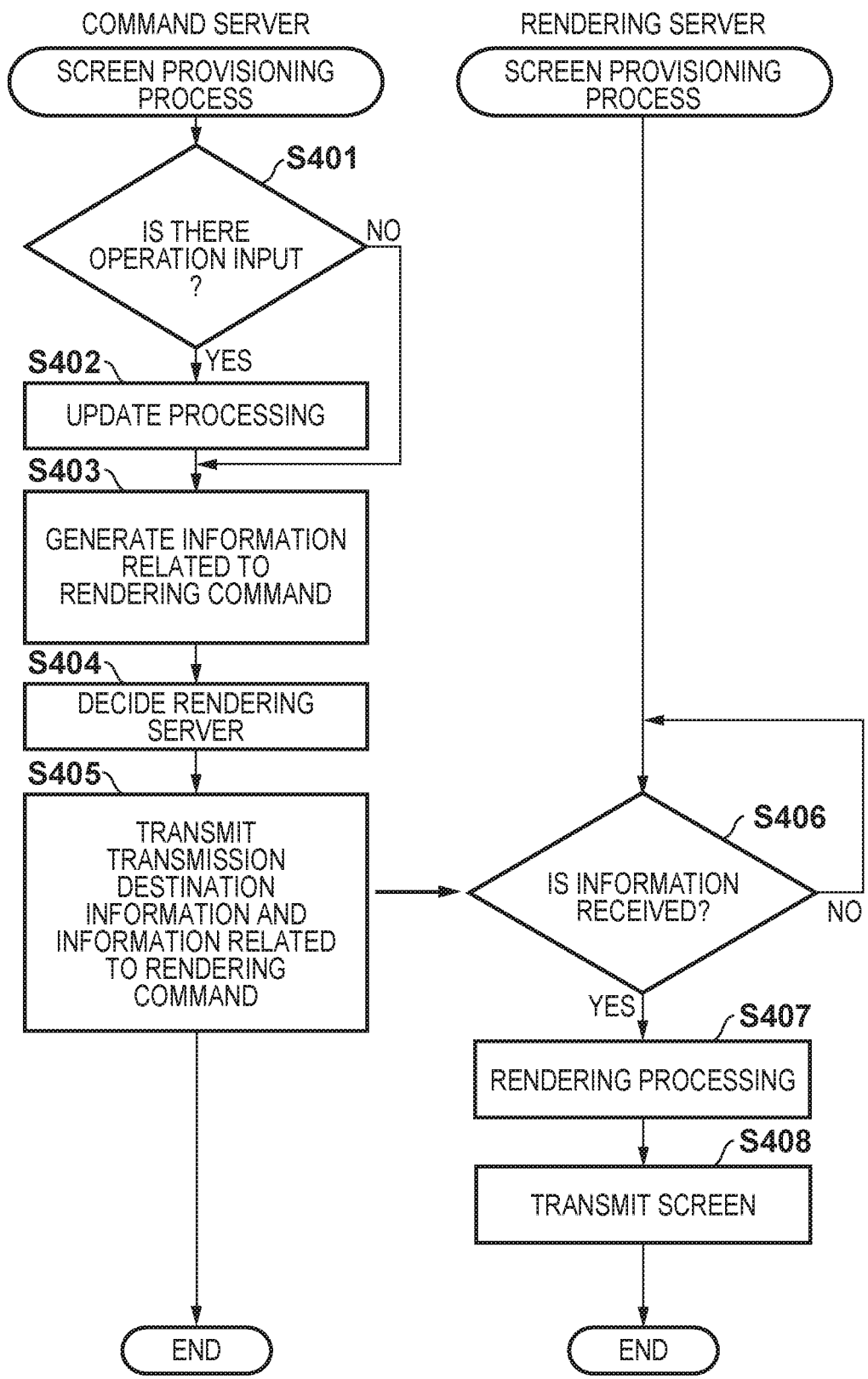
FIG. 4 is a flowchart for exemplifying a screen provisioning process executed on the rendering system according to the first embodiment of the present invention.

Using the flowchart of FIG. 4, explanation is given of specific processing for a screen provisioning process of the rendering system of the present embodiment which has this kind of configuration. The processing corresponding to this flowchart can be implemented by the command CPU 101 of the command server 100 and the rendering CPU 301 of the rendering server 300 each reading out a corresponding processing program stored in their respective ROM, for example, loading it into RAM, and executing it. Explanation is given having this screen provisioning process be started in the command server 100, for example, when a screen transmission request such as a request for provision of game content is made from one of the client terminals 400 (a target client terminal), and be something that is repeatedly executed in accordance with frame updates of a game screen.

In step S401, the command CPU 101 determines whether or not an operation input is performed in the target client terminal. Specifically, the command CPU 101 makes the determination of this step in accordance with whether or not the command communication unit 104 received information according to an operation input from the target client terminal. In a case where the command CPU 101 determines that an operation input was performed, it moves the processing to step S402, and if it determines that it was not performed, it moves the processing to step S403.

In step S402, the command CPU 101, based on information related to the operation input received from the target client terminal, performs processing for updating information of a parameter managed in relation to the game that is provided.

In step S403, the command CPU 101 executes calculation processing necessary for generation of a game screen for the current frame. The calculation processing performed in this step includes processing for calculating parameters necessary for a rendering command or a state change of a dynamic object, or the like for example. Then, after execution of the calculation processing, the command CPU 101 generates, based on the calculation result, a parameter (information related to a rendering command) necessary for generation of the rendering command for the game screen of the current frame.

Figure 5:
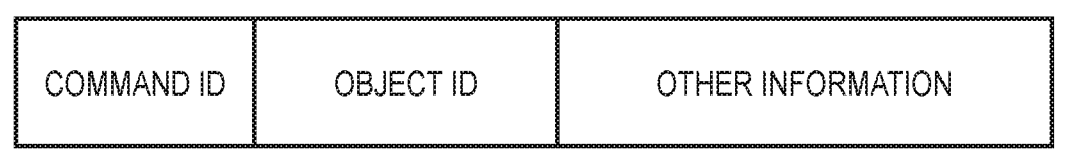

The information related to the rendering command that the command CPU 101 of this embodiment generates is comprised, as illustrated in FIG. 5 for example, by a command ID that specifies the type of the command, an object ID that designates an object that is a target of the command, other information that indicates a parameter used in the execution of the command such as a parameter that is changed in accordance with the command, or the like. This is something whose purpose is to decrease a transmission delay by reducing the data amount instead of outputting the rendering command in an unchanged form, and in this step the command CPU 101 reduces the data amount by configuring the rendering command with data of a more simplified format. The information related to the rendering command is information for which data compression is performed based on a predetermined rule, and it is possible to construct the rendering command from the information in the rendering server 300 in the present embodiment.

However, the information transmitted to the rendering server 300 in the implementation of the invention is not limited to this. Specifically, in the present embodiment explanation is given having information related to the rendering command be transmitted as information from which the rendering command can be configured in the rendering server 300, but the transmitted information may be information for which the information related to the rendering command and the rendering command are equivalent, and may be the rendering command itself. However, considering the aspect of decreasing transmission delay, it goes without saying that it is advantageous to transmit information related to the rendering command which is information that has a smaller data amount.

In step S404, the command CPU 101 decides the rendering server 300 to cause to perform the rendering of the game screen. Specifically, the command CPU 101 specifies a rendering resource that becomes necessary when performing processing related to the screen rendering in accordance with the rendering command indicated by information related to the rendering command. Then the command CPU 101 obtains from the command loading grasping unit 105 information of one of the rendering server 300, out of the connected rendering servers 300, that has loaded the specified rendering resource into the loading region, and decides it to be the rendering server 300 to cause to perform the rendering. Alternatively, the command CPU 101, in a case where a rendering server 300 that has loaded the specified rendering resource into the loading region is not present, decides, out of the rendering servers 300 that are connected, a rendering server 300 that has still not loaded a rendering resource of a predetermined type such as a background texture having a large data amount, for example. In this fashion, it is possible to control such that respectively different rendering resources are loaded into the GPU memory 306 of each rendering server 300 that is connected.

The determination as to whether or not the rendering resource required for the screen rendering is loaded into the loading region need not be a determination for which all rendering resources used in the generation of the game screen related to the rendering command match. Because, in a game that proceeds while switching scenes, for example, rendering resources such as rendering objects and background textures arranged in a field are predetermined for each scene, the determination may be made depending on whether or not there is loading of resources among these whose data amount is greater than or equal to a threshold. Also, because a background texture or the like typically tends to have a large data amount, the determination may be made depending on whether or not a background texture, or the like, is loaded. In such a case, control may be performed such that all background textures used in the game are loaded into the GPU memory 306 of different rendering servers 300.

In step S405, the command CPU 101 transfers to the command communication unit 104 the transmission destination information and the information related to the rendering command, and transmits them to the rendering server 300 decided in step S404.

In step S406, the rendering CPU 301 determines whether or not information of the transmission destination and information related to the rendering command are received from the associated command server 100. The rendering CPU 301 moves the processing to step S407 in a case where it determines that the information of the transmission destination and the information related to the rendering command are received, and repeats the processing of this step in the case where it determines it is not received.

In step S407, the rendering CPU 301 reconstructs the rendering command from the information related to the received rendering command, and transfers it to the GPU 305. Also, the rendering CPU 301 reads a new rendering resource from the resource DB 307 as necessary and loads it into the GPU memory 306. Here, the new rendering resource read as necessary indicates, out of the rendering resources necessary for the rendering of the game screen, a rendering resource that is still not loaded into the GPU memory 306. Then, the GPU 305 renders the game screen in accordance with the rendering command using the rendering resources loaded into the GPU memory 306.

In step S408, the GPU 305 encodes the game screen, and the rendering CPU 301 transfers the data of the encoded game screen to the rendering communication unit 304, and transmits it to the target client terminal based on the transmission destination information.

In this fashion, it is possible to decrease a calculation amount for rendering processing for the whole rendering system by suitably using rendering resources used for rendering of a game screen in the rendering system of this embodiment.

In the present embodiment, explanation is given having the rendering server 300 be configured as a single server, but implementation of the present invention is not limited to this. In a case where rather than being configured as a single server, for example, configuration is as one rendering unit (for example, a GPU) for which respectively independent loading regions are assigned, the command server 100 may be configured to be a device that also serves as an apparatus for rendering that has a plurality of rendering units. In such a case, the command CPU 101 may specify the loading region in which a rendering resource to be used in the generation of a game screen corresponding to a rendering command is loaded, and assign generation of a screen to a rendering unit that the loading region is associated with.

As explained above, the rendering system of this embodiment can suitably decrease a calculation amount of rendering processing for a screen to transmit to a client terminal. Specifically, the rendering system has a command server that outputs information according to a screen rendering command based on information received from the client terminal, and a rendering server that performs rendering of the screen in accordance with information related to the rendering command received from the command server, and transmits it to the client terminal. The command server outputs information related to the rendering command and transmission destination information to a rendering server, in which at least some of the rendering resources required when performing rendering of a screen in accordance with the information related to the rendering command are loaded, among a plurality of rendering servers associated with the command server. Then, the rendering server reads the rendering resources from the required rendering resources that are still not loaded to load them into the loading region to hold them, performs the rendering of the screen based on the information related to the rendering command, and transmits it to the target client terminal.

Second Embodiment

In the above described embodiment, explanation is given for a method in which, by effective application of rendering resources in each of the rendering servers 300 that are connected to the command server 100, the calculation amount of rendering processing for the rendering system on the whole is decreased. Specifically, explanation was given for an embodiment in which rendering resources are suitably applied by deciding, from the rendering servers 300 connected to the command server 100, one of the rendering servers 300 in which a rendering resource that is required when performing processing according to a screen rendering is loaded into the loading region, as the server that is caused to performed the rendering. In the present embodiment, further explanation is given of a method that decreases a transmission delay between the server and the client terminal by using rendering resources suitably.

In a network game service such as in PTL1, game screens are transmitted, and therefore the amount of communication data between the server and the client terminal is larger when compared with conventional network game services, and transmission delay may have an impact. That is, for a scheme in which rendered game screens are transmitted in a streaming format, while the application of data compression or the like is performed, a large amount of data communication is constantly performed as compared against data required for rendering game screens conventionally, and therefore communication bandwidth may be pressed. In a case where the transfer path between the server and the client terminal is long, transmission delays due to such pressure on the communication bandwidth occur more noticeably, and there is a possibility that this will create an obstacle to the game experience of the user.

In particular, in a game having a high so-called real-time nature requiring a capability to respond before a change made in accordance with an operation input of the user is reflected in a game screen, such a transmission delay may result in causing the nature of the game to break. In the present embodiment, with reference to the following drawings, detailed explanation is given for a rendering system that decreases such a transmission delay.

The embodiments explained below explain an example in which the present invention is applied to a game system in which game screens are rendered in accordance with screen requests received from a client terminal via a network, and obtained game screens are transmitted to a client terminal in a streaming format via a network, as an example of a rendering system. However, the present invention is not limited to games, and is also applicable to any device and system capable of rendering a screen according to a request from a client terminal and transmitting an obtained screen to the client terminal. Also, in the following explanation, the same reference numerals are given to configurations similar to in the above described rendering system of the first embodiment, and explanation thereof is omitted.

<Rendering System Configuration>

Figure 6:
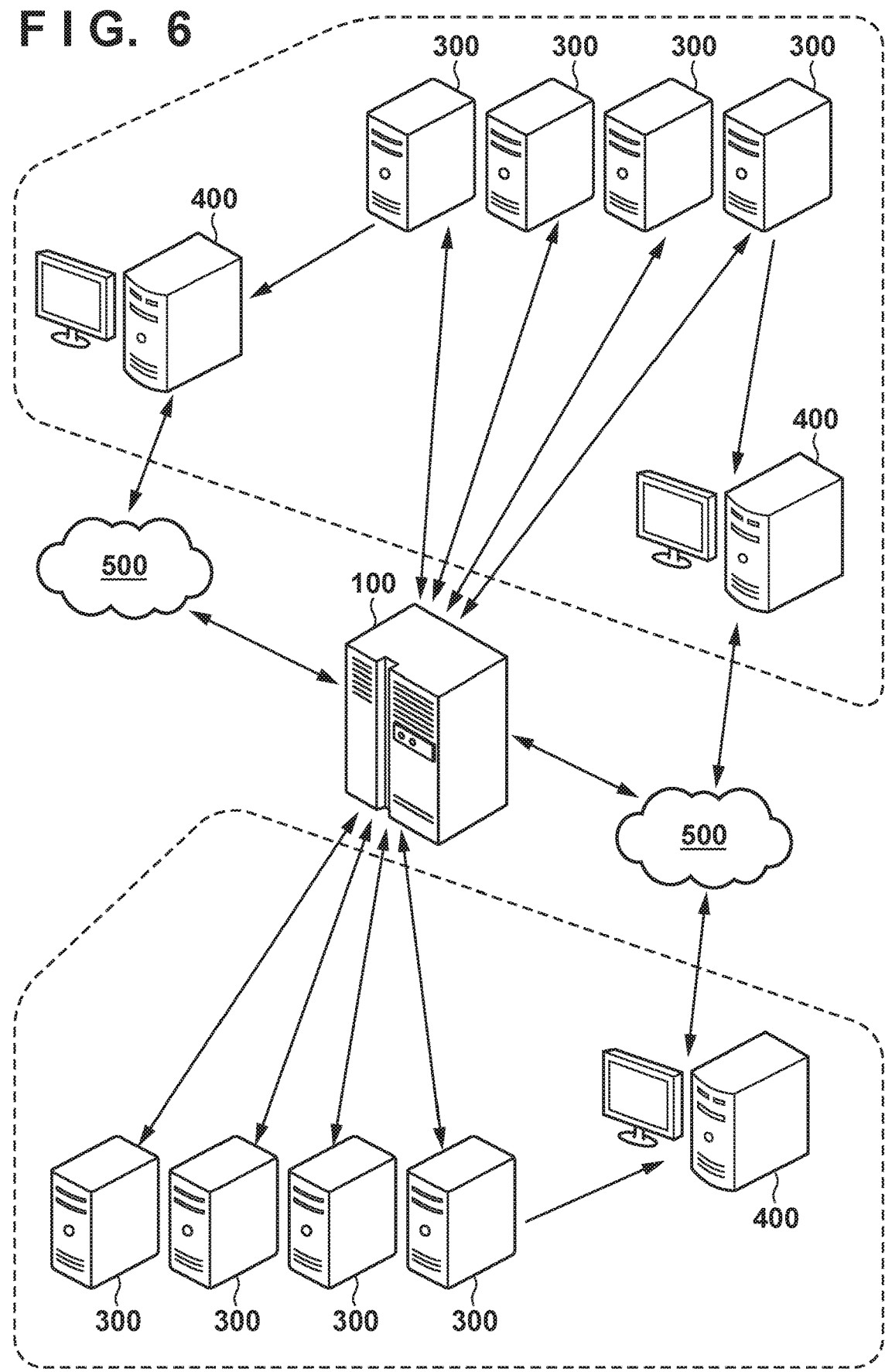
FIG. 6 is a view for illustrating a system configuration of the rendering system according to a second embodiment of the present invention.

FIG. 6 is a view for illustrating a system configuration of a rendering system according to a second embodiment of the present invention. Similarly to the first embodiment, the rendering system of this embodiment is capable of rendering game screens in response to requests received from each client terminal 400 and transmitting those to the respective client terminal 400.

Firstly, when a request for provision of a game screen is made to the command server 100 via the network 500 from one client terminal 400 by an operation of a user or the like, the command server 100 executes calculation processing related to the game screen to provide, and generates information related to a rendering command for the game screen. Also, the command server 100 makes a specification of a region in which a client terminal 400 to which provisioning of game screens is performed is present, i.e. an access location, and decides a group of rendering servers 300 that perform provisioning of game screens to that client terminal 400. In the present embodiment, explanation is given having the rendering of game screens that are provisioned to the client terminal 400 be assigned to a group of rendering servers 300 arranged in a region closest to the region in which the client terminal 400 is present, but implementation of the present invention is not limited to this. That is, rather than specifying the location of the client terminal 400 specifically, and then strictly assigning rendering processing to the group of rendering servers 300 arranged in the closest region, rendering processing may be assigned to a group of rendering servers 300 arranged in a region associated with the specified region.

A group of rendering servers 300 are configured in each region, where a plurality of rendering servers 300 are arranged in respective predetermined regions. However, the number of rendering servers 300 arranged to each region in the implementation of the invention is not limited to this, and may be appropriately decided in alignment with a number of users or the like of the region. Each of the rendering servers 300, similar to the first embodiment, has a rendering resource (a rendering program that implements model data, texture data, screen effects or the like) required for generation of the game screen, loads the resource and performs rendering of the game screen while using it.

<Configuration of the Command Server 100>

Figure 7:
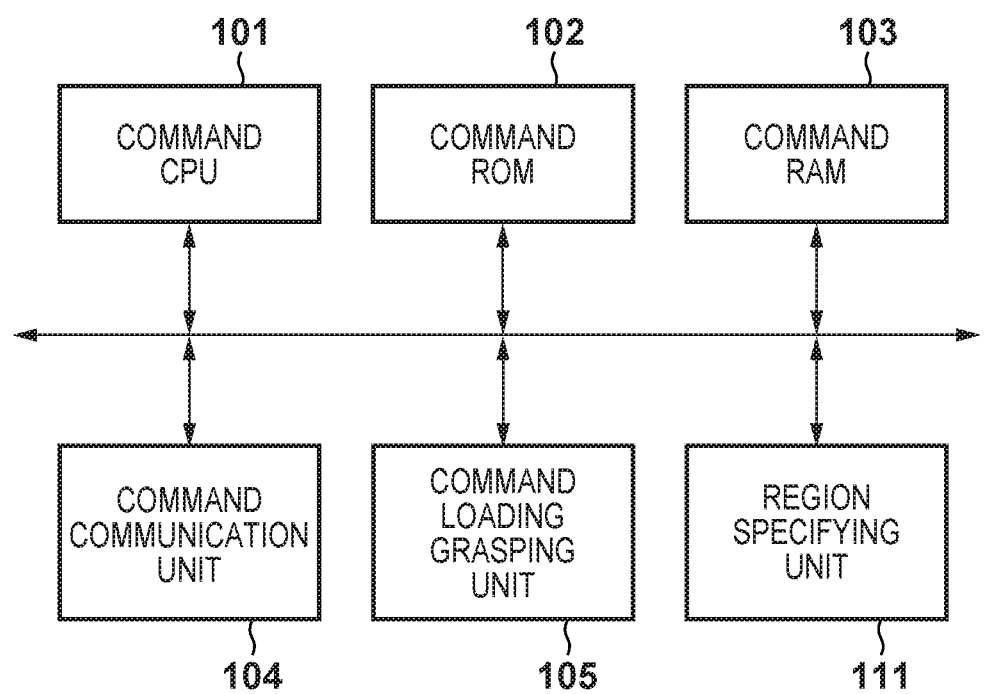
FIG. 7 is a view for illustrating a functional configuration of the command server 100 according to the second embodiment of the present invention.

FIG. 7 is a block diagram for illustrating a functional configuration of the command server 100 according to the rendering system of this embodiment.

The command server 100 of this embodiment also has a region specifying unit 111 in addition to the configuration of the first embodiment. The region specifying unit 111 specifies a region in which the client terminal 400 is present from information used for establishing a communication connection with the client terminal 400 or information of a transmission destination address included in the screen transmission request received from the client terminal 400 for example.

<Screen Provisioning Process>

Figure 8:
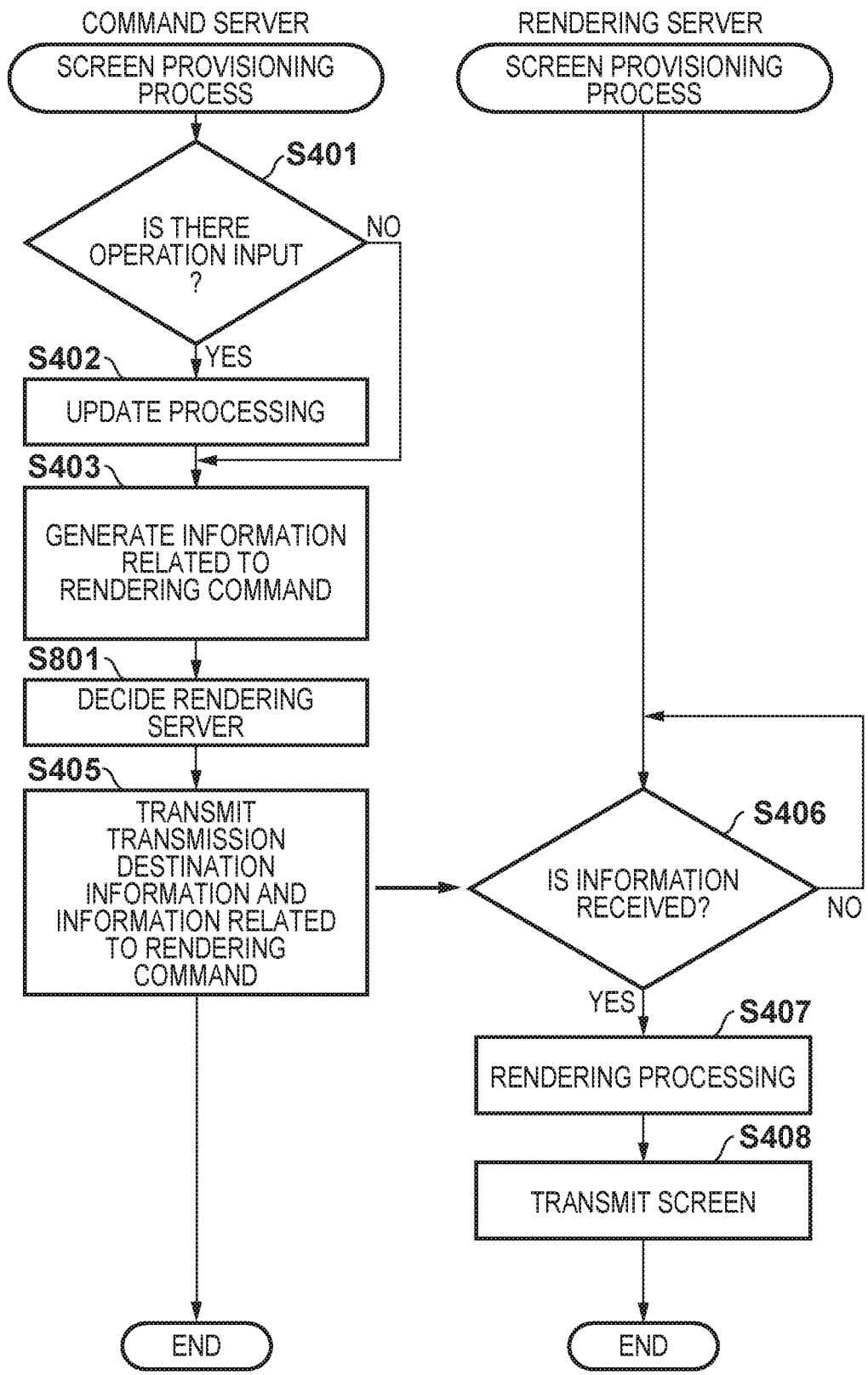
FIG. 8 is a flowchart for exemplifying a screen provisioning process executed in the rendering system according to the second embodiment of the present invention.

Next, using the flowchart of FIG. 8, explanation is given of specific processing for a screen provisioning process of the rendering system of the present embodiment. The processing corresponding to this flowchart can be implemented by the command CPU 101 of the command server 100 and the rendering CPU 301 of the rendering server 300 each reading out a corresponding processing program stored in the respective ROM, for example, loading it into RAM, and executing it. Explanation is given having this screen provisioning process be started in the command server 100, for example, when a screen transmission request such as a request for provision of game content is made from one of the client terminals 400 (a target client terminal), and be something that is repeatedly executed in accordance with frame updates of a game screen. Also, in the explanation of the screen provisioning process that follows, steps that perform the same processing as in the first embodiment are given the same reference numerals and explanation of these is omitted, and explanation is limited to only steps that perform characteristic processing in the screen provisioning process of this embodiment.

After generating the information related to the rendering command in step S403, in step S801 the command CPU 101 decides the rendering server 300 to cause to perform the rendering of the game screen, and moves the processing to step S405. Specifically, the command CPU 101 specifies a rendering resource that is necessary for when performing processing related to the screen rendering in accordance with the rendering command indicated by information related to the rendering command. Thus, the command CPU 101 specifies the group of rendering servers 300 that corresponds to the region in which target client terminal is present, based on the information of the region in which the target client terminal specified by the region specifying unit 111 is present. The command CPU 101 obtains from the command loading grasping unit 105 information of one of the rendering server 300, out of the group of rendering servers 300, that has loaded the specified rendering resource into the loading region, and decides it to be the rendering server 300 to cause to perform the rendering. If there is no rendering server 300 in the group of rendering servers 300 that has loaded the specified rendering resource into a loading region, the command CPU 101 decides, from the group of the rendering servers 300, a rendering server 300 that has still not loaded a predetermined type of rendering resource.

In this fashion, it is possible to decrease a calculation amount for rendering processing for the whole rendering system by suitably using rendering resources used for rendering of a game screen in the rendering system of this embodiment. Also in the rendering system, it is possible to shorten the transfer path for transmission of the game screen, and thereby efficiently decrease transmission delays when providing to the client terminal screens rendered in accordance with screen requests.

Also, the transmission delay problem described above can be decreased if the transfer path is shortened when transmitting to the target client terminal a game screen for which a data amount may become large. Specifically, the present invention in one embodiment achieves a similar effect even if information to transmit from the command server 100 to the rendering server 300 is set as the rendering command itself and not information related to the rendering command. In other words, because this effect can be realized regardless of which of data of the rendering command and data that simplifies the rendering command is transmitted, in one embodiment information related to a rendering command may represent either of these two pieces of data.

In the present embodiment, explanation is given having the rendering server 300 be configured as a single server, but similarly to the first embodiment, implementation of the present invention is not limited to this. In other words, configuration may be taken to arrange a rendering server having a plurality of rendering units in each region, instead of a group of the rendering servers 300, if configuring each rendering server 300 of the group of rendering servers 300 as one rendering unit (for example a GPU) to which respectively independent loading regions are assigned, instead of configuring it as a single server as in this embodiment. In such a case, configuration may be taken such that, upon receiving the information related to the rendering command from the command server 100, the rendering server of each region specifies a loading region to which the rendering resource to be used in generation of a game screen corresponding to the rendering command is loaded, and assigns generation of the screen to the rendering unit associated with the loading region.

[Variation]

In the above described second embodiment, explanation was given regarding a method for decreasing transmission delay by assigning rendering of a game screen to a rendering server having a short transfer path to cause improvement of screen updating response performance with respect to an operation performed in a client terminal. However, a method for decreasing a transmission delay is not limited to this.

For example, configuration may be taken such that deciding the rendering server 300 that is caused to render the game screen to be performed in step S801 of the screen provisioning process of the second embodiment extracts rendering server 300 groups arranged in a plurality of regions determined as corresponding to a region in which the target client terminal is present, selecting one of the rendering server 300 groups based on an operation state such as a total number of connected terminals, an average transmission rate, a GPU operation rate, and a congestion status, and deciding one rendering server 300 from this group in accordance with a load state of the rendering resources. Alternatively, instead of selecting the rendering server 300 group in accordance with an operation state, configuration may be taken to decide one rendering server 300 in accordance with the operation state, from rendering servers 300 that have loaded a rendering resource necessary when performing processing for screen rendering in accordance with a rendering command and that are arranged in a region corresponding to a region in which the target client terminal is present. In addition, it is not necessary to limit the rendering server 300 that is caused to perform rendering of a game screen to something arranged in a region set as corresponding to a region in which a target client terminal is present, and configuration may be taken to decide a rendering server 300 arranged at any location, simply based only on a status of loading of rendering resources and an operation state.

In addition, grasping the operation state may be performed based on at least one of a length of a transfer path, a congestion status, a GPU operation rate, an average transmission rate, and a number of connected terminals, for example, or may be based on a combination of these. To evaluate the operation state, an evaluation formula that has at least one of these items as an evaluation coefficient may be arranged. In a situation where there is a comparatively large number of rendering servers connected to the command server 100, because a scheme in which the command CPU 101 calculates evaluation values for all of the rendering servers 300 may press calculation resources in the command server 100, configuration may be taken so that an evaluation value is transmitted to the command server 100 from each rendering server 300.

Third Embodiment

In the above described second embodiment, the command server 100 was explained as being able to grasp information of rendering server 300 groups of all regions, as well as rendering resources loaded in the loading region of each rendering server 300. However, there is the possibility that central control, in the command server 100, of information of rendering resources loaded in all rendering servers 300 for each region is not realistic due to the scale of a rendering system. In other words, in addition to the calculation processing necessary for generation of a game screen for a frame to provide to each client terminal, the command server 100 grasps a loading status of rendering resources for this processing, so there is a possibility that a load will be concentrated on the command server 100. In the present embodiment, explanation is given of an example of arranging a relay apparatus for managing a rendering resource loading status of each rendering server 300 of a rendering server 300 group for each region in order to perform load distribution for such a rendering system.

Explanation in regard to the rendering system of this embodiment is given below in detail with reference to the drawings. The embodiments explained below explain an example in which the present invention is applied to a game system in which game screens are rendered in accordance with screen requests received from a client terminal via a network, and obtained game screens are transmitted to a client terminal in a streaming format via a network as an example of a rendering system. However, the present invention is not limited to games, and is also applicable to any device and system capable of performing rendering of a screen according to a request from a client terminal and transmitting an obtained screen to the client terminal. Also, in the following explanation, the same reference numerals are given to configurations similar to in the above described rendering system of the first and second embodiments, and explanation thereof is omitted.

<Rendering System Configuration>

Figure 9:
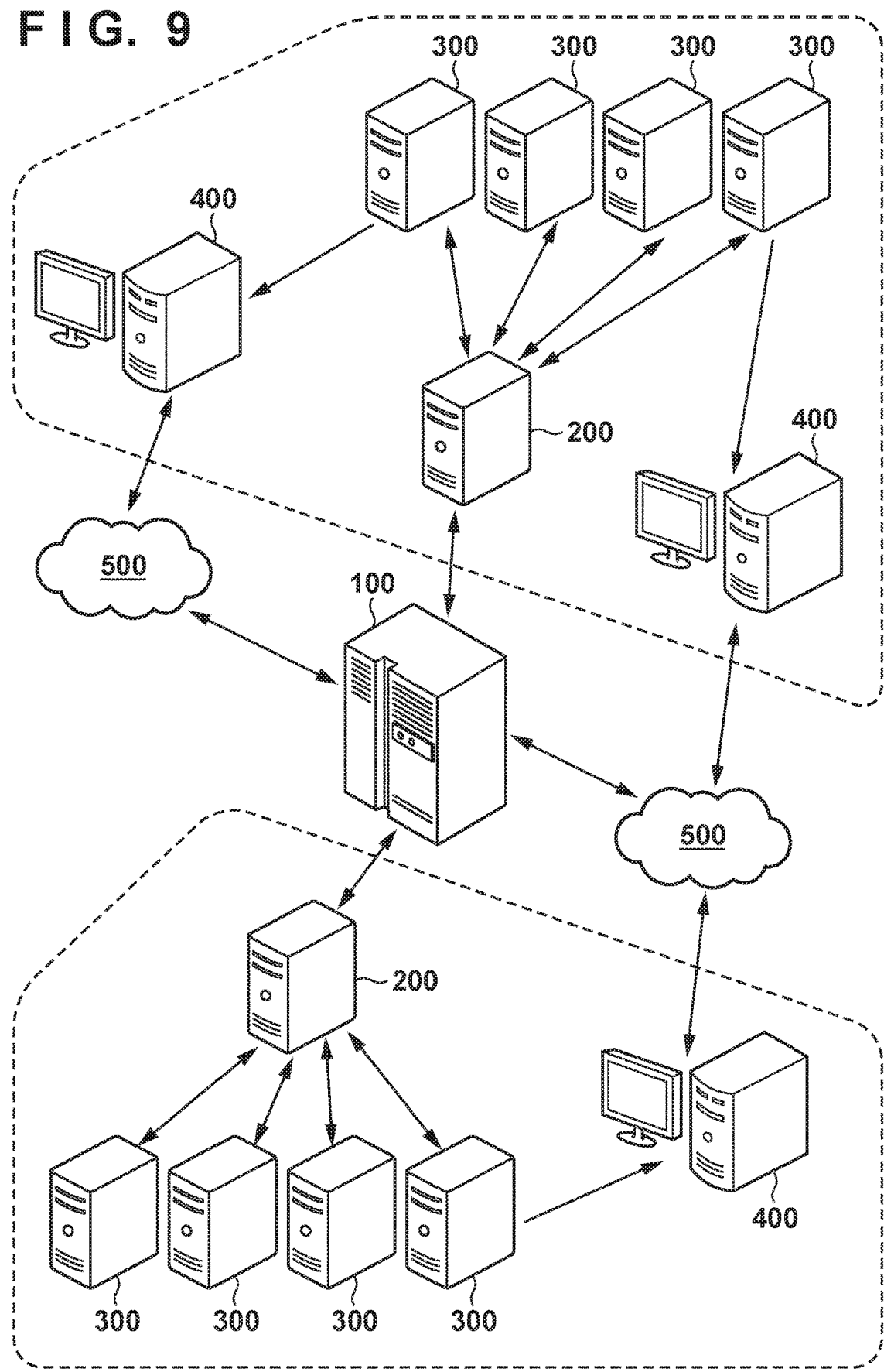
FIG. 9 is a view for illustrating a system configuration of a rendering system according to a third embodiment of the present invention.

FIG. 9 is a view for illustrating a system configuration of a rendering system according to embodiments of the present invention. Similarly to the first and second embodiments, the rendering system of this embodiment renders game screens in response to requests received from each client terminal 400 and transmits those to the respective client terminal 400.

Firstly, when a request for provision of a game screen is made to the command server 100 via the network 500 from one client terminal 400 by an operation of a user or the like, the command server 100 executes the calculation processing related to the provided game screen, and generates information related to a rendering command for the game screen. Also, the command server 100 makes a specification of a region in which is present a client terminal 400 to which provisioning of game screens is performed, i.e. an access location, and decides a group of rendering servers 300 that perform provisioning of game screens to that client terminal 400. In the present embodiment, similarly to the second embodiment, explanation is given having the rendering of game screens that are provisioned to the client terminal 400 be assigned to a group of rendering servers 300 arranged in a region closest to the region in which the client terminal 400 is present, but implementation of the present invention is not limited to this.

A group of rendering servers 300 are configured in each region, where a plurality of rendering servers 300 are arranged in respective predetermined regions. Each of the rendering servers 300, similar to the first and second embodiments, has a rendering resource (a rendering program that implements model data, texture data, screen effects or the like) required for generation of the game screen, loads the resource and performs rendering of the game screen while using it. The rendering server 300 that actually performs rendering of the game screen is decided by the relay apparatus 200 that received the information related to the rendering command from the command server 100.

A relay apparatus 200 is arranged in each region similarly to the rendering server 300 group, and is associated with the rendering server 300 group of a corresponding region. In addition, the relay apparatus 200 decides one server from the rendering server 300 group as the rendering server 300 for performing generation of the game screen, and causes rendering of the game screen to be performed by relaying the information related to the rendering command to the server.

In FIG. 9, only the command server 100 and the client terminals 400 are connected via the network 500, and the command server 100 and the relay apparatuses 200, the relay apparatuses 200 and each rendering server 300, as well as the rendering servers 300 and the client terminals 400 are not illustrated as being connected via the network 500. This simply describes not going through the network 500 in order to clarify the flow of information from the command server 100 to the relay apparatuses 200, from the relay apparatuses 200 to each rendering server 300, and from the rendering servers 300 to the client terminals 400, and it can be easily understood that communication between these devices is performed via the network 500 or another network.

Below, block diagrams are illustrated to explain a functional configuration for each apparatus of the game system of this embodiment that this kind of system configuration has. In the following explanation, similar hardware used in a plurality of apparatuses is explained adding the prefixes "command", "relay" and "rendering" respectively for the command server 100, the relay apparatuses 200 and the rendering servers 300 in order to distinguish the hardware between apparatuses. However, these prefixes are simply added in order to distinguish the hardware between the apparatuses, and these are not used in order to specify the function or operation of the hardware in the description of this embodiment.

<Configuration of the Command Server 100>

Figure 10:
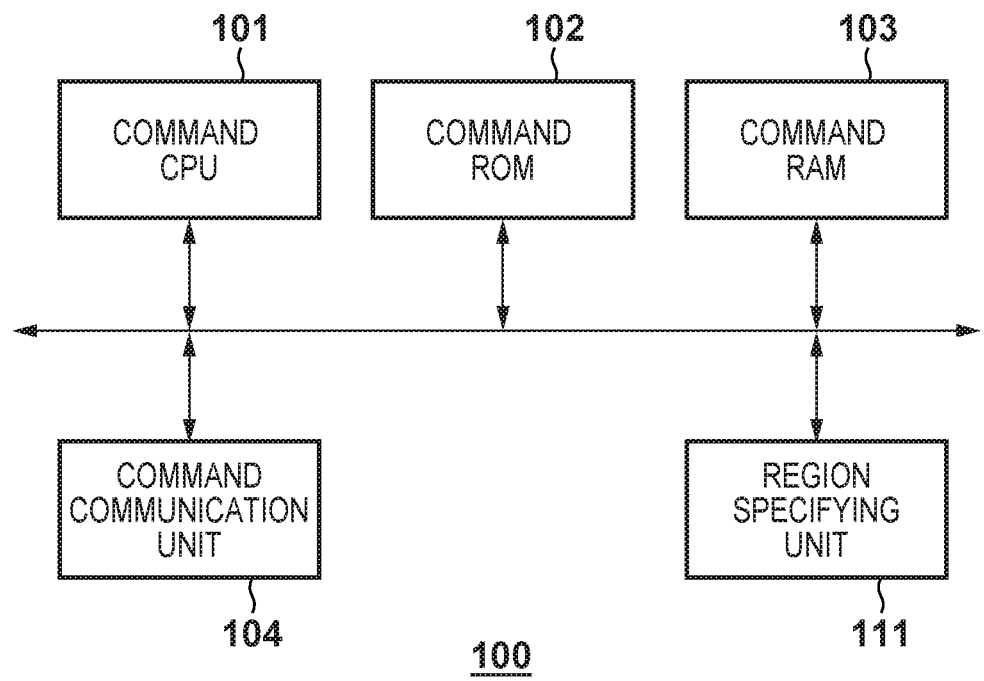
FIG. 10 is a view for illustrating a functional configuration of the command server 100 according to the third embodiment of the present invention.

FIG. 10 is a block diagram for illustrating a functional configuration of the command server 100 according to the rendering system of this embodiment. Because the command server 100 of this embodiment has a similar configuration to that of the second embodiment, except for that the command loading grasping unit 105 has been excluded, detailed explanation is omitted.

<Configuration of the Relay Apparatus 200>

Figure 11:
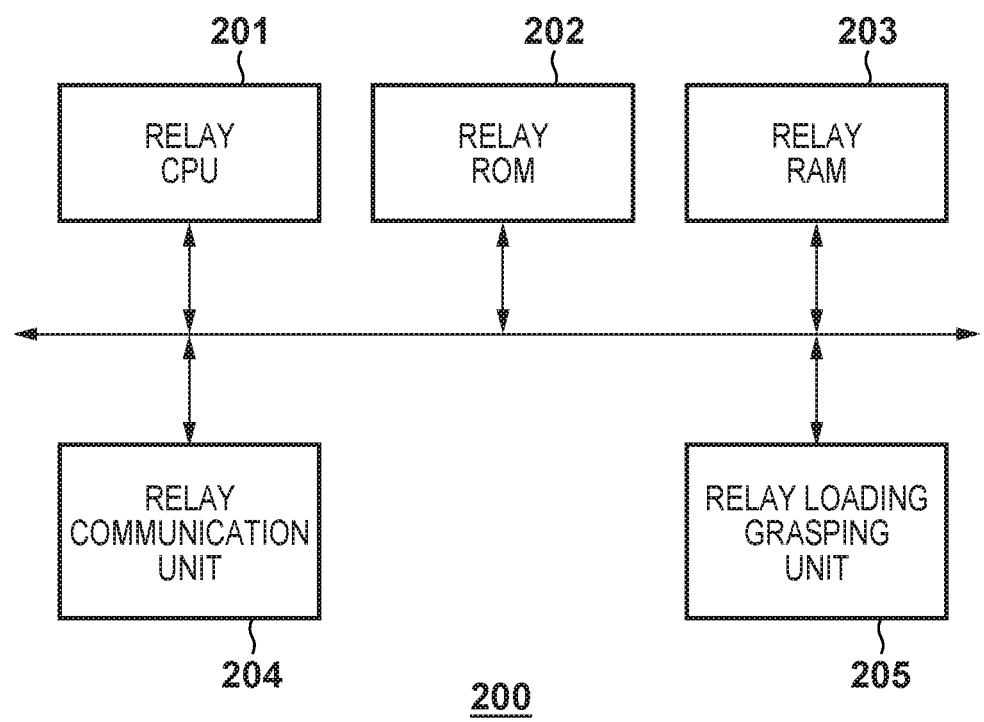
FIG. 11 is a view for illustrating a functional configuration of the relay apparatus 200 according to the third embodiment of the present invention.

FIG. 11 is a block diagram for illustrating a functional configuration of the relay apparatuses 200 according to the rendering system of this embodiment.

A relay CPU 201 controls operation of each block that the relay apparatus 200 has. Specifically, the relay CPU 201 controls operation of each block by reading an operation program of the respective block that is stored in a relay ROM 202, loading it into a relay RAM 203, and executing it.

The relay ROM 202 is a storage apparatus that stores data permanently, such as a non-volatile memory for example. The relay ROM 202 stores not only an operation program of each block that the relay apparatus 200 has, but also information such as parameters required in operation of each block. Also, the relay RAM 203 is a volatile memory. The relay RAM 203 is used not only as a loading region for operation programs of each block, but also as a storage region for intermediate data outputted in the operation of each block, or as a work region for performing processing of each block.

A relay communication unit 204 is an interface for communication with an external apparatus that the relay apparatus 200 has. In the present embodiment, the relay communication unit 204 receives from the command server 100 information related to the rendering command and transmission destination information, and receives from each rendering server 300 group associated with the relay communication unit 204 information of rendering resources loaded into the GPU memory 306 of the rendering servers 300. Also, the relay communication unit 204 transmits the transmission destination information and information related to rendering commands to the rendering server 300 that is to be caused to perform rendering of the game screen.

The relay loading grasping unit 205 manages information of rendering resources loaded into the GPU memory 306 that is received from each associated rendering server 300 groups in association with identification information of the respective rendering server 300. In the present embodiment, for a game screen that is rendered in accordance with a rendering command, the relay CPU 201 assigns rendering of the game screen to a rendering server 300 for which a rendering resource that is used is already loaded into the GPU memory 306. As described above, this is based on an attempt to optimize rendering processing by reusing the rendering resource loaded into the GPU memory 306.

In the present embodiment, explanation is given having information of rendering resources that are loaded into the GPU memory 306 be transmitted to the relay apparatus 200 from the rendering server 300, and having the relay loading grasping unit 205 specify a rendering server 300 in which a rendering resource corresponding to the rendering command is already loaded based on this information, but implementation of the present invention is not limited to this. For example, in a case where in the rendering server 300 group, the rendering server 300 that performs loading into the GPU memory 306 for each rendering resource used for the generation of a game screen, such as texture data having a particularly large data amount, is determined in advance, it is not necessary that information of the loaded rendering resources be transmitted to the relay apparatus 200. In such a case, the relay CPU 201 may decide a rendering server 300 to which to transmit information related to a rendering command based on information of the rendering server 300 determined in advance. For example, the relay CPU 201 may obtain scene information related to a game screen that is generated from information related to a rendering command, and assign rendering of the game screen to a rendering server 300 for which loading of a rendering resource corresponding to that scene is assigned in advance.

<Screen Provisioning Process>

Figure 12:
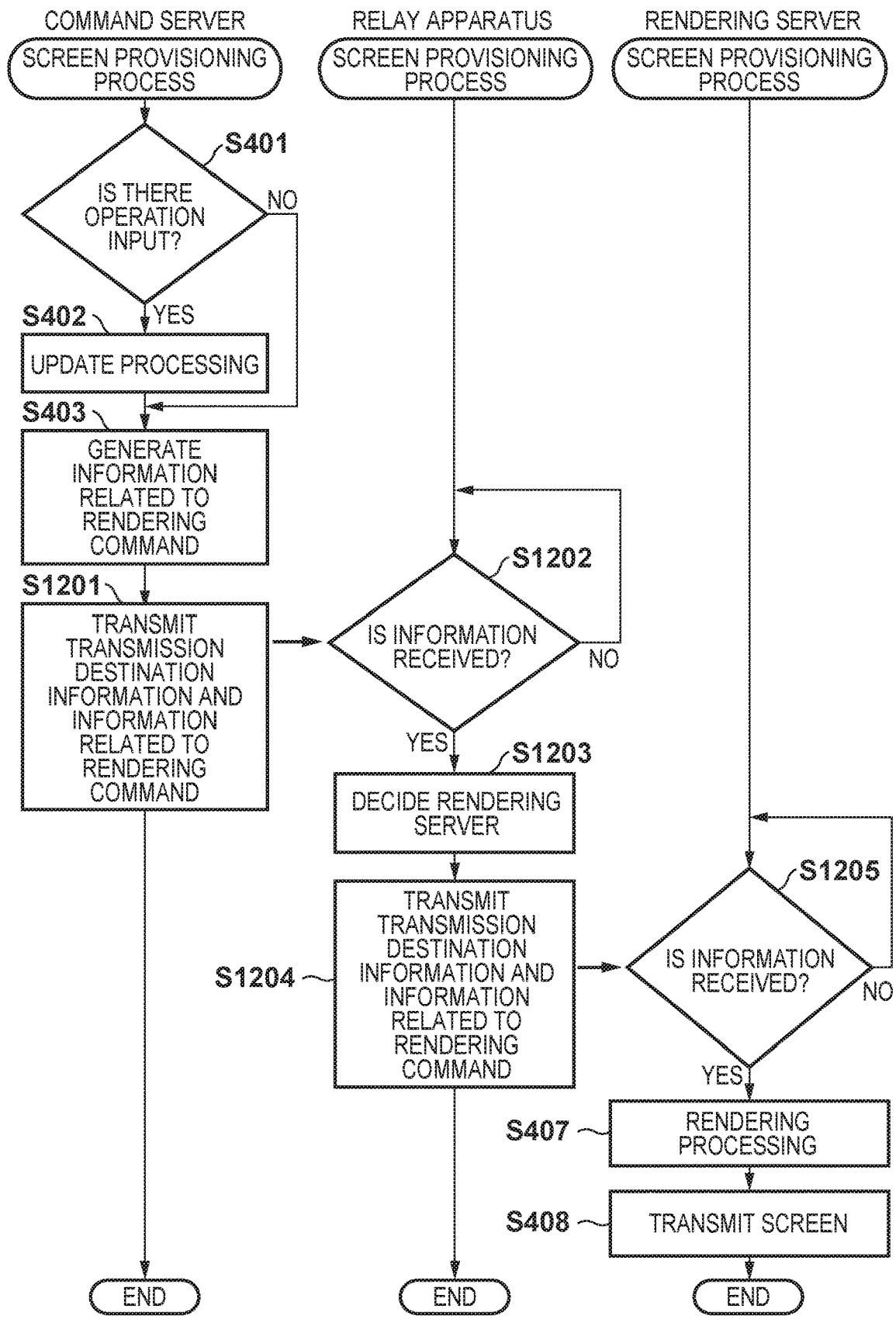
FIG. 12 is a flowchart for exemplifying a screen provisioning process executed on the rendering system according to the third embodiment of the present invention.

Using the flowchart of FIG. 12, explanation is given of specific processing for a screen provisioning process of the rendering system of the present embodiment which has this kind of configuration. The processing that corresponds to this flowchart can be implemented by each of the command CPU 101 of the command server 100, the relay CPU 201 of the relay apparatuses 200, and the rendering CPU 301 of the rendering servers 300 reading a corresponding processing program stored in a respective ROM, for example, loading it into RAM, and executing it. Explanation is given having this screen provisioning process be started in the command server 100, for example, when a screen transmission request such as a request for provision of game content is made from one of the client terminals 400 (a target client terminal), and be something that is repeatedly executed in accordance with frame updates of a game screen. Also, in the explanation of the screen provisioning process that follows, steps that perform the same processing as in the first and second embodiments are given the same reference numerals and explanation of these is omitted, and explanation is limited to only steps that perform characteristic processing in the screen provisioning process of this embodiment.

After generating the information related to the rendering command in step S403, in step S1201 the command CPU 101 transfers to the command communication unit 104 the generated information related to the rendering command, and the transmission destination information that is necessary for transmitting data to the target client terminal, and causes output to the relay apparatus 200. The relay apparatus 200 that is the target for information output by the command communication unit 104 in this step is something that the command CPU 101 decides based on information of a region in which the target client terminal specified by the region specifying unit 111 is present.

In step S1202, the relay CPU 201 determines whether or not the transmission destination information and the information related to the rendering command are received from the command server 100. The relay CPU 201 moves the processing to step S1203 in a case where it determines that the transmission destination information and the information related to the rendering command are received, and repeats the processing of this step in the case where it determines it is not received.

In step S1203, the relay CPU 201 decides the rendering server 300 to cause to perform the rendering of the game screen. Specifically, the relay CPU 201 specifies a rendering resource that becomes necessary when performing processing related to the screen rendering in accordance with the rendering command indicated by information from the information related to the rendering command. The relay CPU 201 then obtains from the relay loading grasping unit 205 information of one rendering server 300, from the rendering server 300 group associated with the relay apparatus 200, that has loaded the specified rendering resource in the loading region thereof, and decides it to be the rendering server 300 to cause rendering to be performed. Alternatively, if a rendering server 300 that has loaded the specified rendering resource into the loading region thereof is not present, the relay CPU 201 decides a rendering server 300 that has not yet loaded a predetermined type of rendering resource, for example a background texture that has a large data amount. In this fashion, it is possible to control such that respectively different rendering resources are loaded into the GPU memory 306 of each server of the rendering server 300 group.

In step S1204, the relay CPU 201 transfers to the relay communication unit 204 the transmission destination information and the information related to the rendering command, and transmits them to the rendering server 300 decided in step S1203.

In step S1205, the rendering CPU 301 determines whether or not information of the transmission destination and information related to the rendering command are received from the associated relay apparatus 200. The rendering CPU 301 moves the processing to step S407 in a case where it determines that the information of the transmission destination and the information related to the rendering command are received, and repeats the processing of this step in the case where it determines it is not received.

In this fashion, it is possible to decrease a calculation amount for rendering processing for the whole rendering system by suitably using rendering resources used for rendering of a game screen in the rendering system of this embodiment. Also in the rendering system, it is possible to shorten the transfer path for transmission of the game screen, and thereby efficiently decrease transmission delays when providing to the client terminal screens rendered in accordance with screen requests. In addition, it is possible to disperse a processing load due to monitoring of a loading status of rendering resources in the rendering system.

In the present embodiment, the relay apparatus 200 was explained as something arranged as an entity that separated the command server 100 and the rendering server 300, but the implementation of the present invention is not limited to this. Configuration may be taken such that the relay apparatus 200 is configured as integrated in the command server 100, and transmits information related to a rendering command after designating a specific rendering server 300 from the rendering server 300 group of each region. In addition, instead of configuring the rendering server 300 as a single server as in this embodiment, in a case in which it is configured as one rendering unit (for example, a GPU) to which a respectively independent loading regions are assigned, the relay apparatus 200 may be configured as integrated in an apparatus for rendering that has a plurality of rendering units. In such a case, configuration may be taken such that, upon receiving the information related to the rendering command from the command server 100, the relay apparatuses 200 specify a loading region to which a rendering resource to be used in generation of a game screen corresponding to the rendering command is loaded, and assigns generation of the screen to the rendering unit associated with the loading region.

In addition, explanation was given in the present embodiment of performing reconstruction, in the rendering server 300, of the rendering command from the information related to the rendering command, but reconstruction of the rendering command in the implementation of the present invention may be performed by either of the relay apparatus 200 and the rendering server 300. If reconstruction is performed in the relay apparatus 200, it is possible to decrease a transmission delay between the command server 100 and the relay apparatus 200. In addition, if reconstruction is performed in the rendering server 300, it is possible to decrease transmission delay both between the command server 100 and the relay apparatus 200, as well as between the relay apparatus 200 and the rendering server 300. In other words, an effect of performing data compression of the rendering command and then transmitting it can be implemented regardless of which of the relay apparatus 200 and the rendering server 300 performs reconstruction of the rendering command.

As explained above, it is possible to suitably decrease a calculation amount of rendering processing for a screen to transmit to a client terminal. Specifically, the rendering system has a command server that outputs information according to a screen rendering command based on information received from the client terminal, a rendering server that performs rendering of a screen in accordance with the information related to the rendering command and transmits it to the client terminal, and a relay apparatus that transmits the information related to the rendering command received from the command server to the rendering server. The command server specifies the region in which the target client terminal is present, and outputs transmission destination information and the information related to the rendering command to a relay apparatus that is present in a corresponding region. Also, the relay apparatus transmits the information related to the rendering command and the transmission destination information to a rendering server, in which at least some of the rendering resources required when performing rendering of a screen in accordance with the rendering command are loaded, among a plurality of rendering servers associated with that relay apparatus. Then, the rendering server reads the rendering resources from the required rendering resources that are still not loaded to load them into the loading region to hold them, performs the rendering of the screen based on the information related to the rendering command, and transmits it to the target client terminal.

Other Embodiments

Note, the present invention is not limited to the embodiments described above, and it is possible to make various modifications or changes without deviating from the spirit and scope of the present invention. In addition, the rendering system according to the present invention can be implemented by a program that causes one or more computers to function as each apparatus of the rendering system. The program can be provided/distributed by being stored on a computer-readable storage medium, or through an electronic communication line. To make public the scope of the present invention, the following claims are attached.

The invention claimed is:

1. A rendering system, comprising:
   a command server that, based on information received from a target client terminal, outputs information related to a rendering command for a screen; and
   rendering servers that perform rendering of the screen in accordance with the information related to the rendering command received from the command server and transmit the screen to the target client terminal, wherein
   the command server comprises a first memory and a first processor, the first memory storing a first program, the first processor, by reading the first program, configured to cause the command server to perform first operations including:
   receiving a screen transmission request from the target client terminal;
   generating the information related to the rendering command by executing calculation processing related to the screen to be provided to the target client terminal; and
   outputting transmission destination information that indicates the target client terminal, which is a transmission destination of the screen and the information related to the rendering command, to, out of a plurality of the rendering servers which are associated with the command server, a rendering server that has loaded at least some of rendering resources necessary when performing rendering of the screen in accordance with the information related to the rendering command, the rendering server comprises a second memory and a second processor, the second memory storing a second program, the second processor, by reading the second program, configured to cause the rendering server to perform second operations including:

storing rendering resources to use in rendering of the screen;

reading, from the storage, loading into a loading region, and holding a rendering resource, out of necessary rendering resources, that is not yet loaded, based on the information related to the rendering command output by the command server;

performing, by using the rendering resource held in the loading region, rendering of the screen based on the information related to the rendering command; and transmitting the screen to the target client terminal based on the transmission destination information, the screen transmission request is based on an operation input of the target client terminal that is reflected in the screen that is rendered by the rendering server in response to the screen transmission request, and the screen transmission request is received by the command server in a process during which the command server repeatedly performs the first operations in accordance with frame updates of a game screen.

2. The rendering system according to claim 1,
wherein the first operations further include specifying a region in which the target client terminal is present, and
the plurality of the rendering servers are present in a region corresponding to the region in which the target client terminal is present.

3. The rendering system according to claim 2, wherein the rendering server is closest to the region in which the target client terminal is present.

4. The rendering system according to claim 2, wherein the plurality of the rendering servers that are present in the region corresponding to the region in which the target client terminal is present hold respectively different rendering resources in the loading region.

5. The rendering system according to claim 2, wherein
the screen is the game screen for a predetermined game and is rendered by using rendering resources that differ between scenes,
the information related to the rendering command includes information of a scene that corresponds to the game screen,
the plurality of the rendering servers that are present in the region corresponding to the region in which the target client terminal is present is assigned in advance so that each performs rendering of different scenes of the game, and
the command server transmits the transmission destination information and the information related to the rendering command to the rendering server after referring to the information of the scene included in the information related to the rendering command.

6. The rendering system according to claim 1,
wherein the first operations further include specifying a region in which the target client terminal is present, and
the command server outputs the transmission destination information and the information related to the rendering command after selecting the rendering server that has loaded at least some of the necessary rendering resources from the plurality of the rendering servers, with the plurality of the rendering servers being present in, out of a plurality of regions corresponding to the region in which the target client terminal is present, one region decided based on an operation state of a plurality of the rendering servers present in each region.

7. The rendering system according to claim 6, wherein the operation state of the rendering server is evaluated in accordance with at least one of a number of connected terminals, an average transmission rate, a GPU operation rate, a congestion status, and a length of a transfer path.

8. The rendering system according to claim 1, wherein the command server decides the rendering server based on an operation state.

9. The rendering system according to claim 1, wherein
the first operations further include receiving information related to an operation input that is input in the target client terminal, and
the command server executes the calculation processing for the screen based on the information related to the operation input.

10. A non-transitory computer-readable storage medium recording a program for causing one or more computers to function as the rendering system according to claim 1.

11. A rendering system, comprising:
a command server that, based on information received from a target client terminal, outputs information related to a rendering command for a screen;
rendering servers that perform rendering of a screen in accordance with the information related to the rendering command, and transmit the screen to the target client terminal; and
a relay apparatus that transmits to the rendering servers the information related to the rendering command, the information related to the rendering command being received from the command server, wherein the command server comprises a first memory and a first processor, the first memory storing a first program, the first processor, by reading the first program, configured to cause the command server to perform first operations including:

receiving a screen transmission request from the target client terminal;

generating the information related to the rendering command by executing calculation processing related to the screen to be provided to the target client terminal;

specifying a region in which the target client terminal is present; and outputting transmission destination information that indicates the target client terminal, which is a transmission destination of the screen, and the information related to the rendering command to the relay apparatus, which is present in a region corresponding to the region in which the target client terminal is present, the relay apparatus comprises a second memory and a second processor, the second memory storing a second program, the second processor, by reading the second program, configured to cause the relay apparatus to perform second operations including:

receiving the transmission destination information and the information related to the rendering command output by the command server; and transmitting, with referring to the information related to the rendering command, the transmission destination information and the information related to the rendering command to, out of a plurality of the rendering servers which are associated with the relay apparatus, a rendering server that has loaded at least some of the rendering resources necessary when performing rendering of the screen in accordance with the information related to the rendering command, the rendering server comprises a third memory and a third processor, the third memory storing a third program, the third processor, by reading the third program, configured to cause the rendering server to perform third operations including:

storing rendering resources to use in rendering of the screen;

reading, from the storage, loading into a loading region, and holding a rendering resource, out of necessary rendering resources, that is not yet loaded, based on the information related to the rendering command transmitted by the relay apparatus;

performing, by using the rendering resource held in the loading region, rendering of the screen based on the information related to the rendering command; and transmitting the screen to the target client terminal based on the transmission destination information, the screen transmission request is based on an operation input of the target client terminal that is reflected in the screen that is rendered by the rendering server in response to the screen transmission request, and the screen transmission request is received by the command server in a process during which the command server repeatedly performs the first operations in accordance with frame updates of a game screen.

12. The rendering system according to claim 11, wherein the relay apparatus is closest to the region in which the target client terminal is present.

13. The rendering system according to claim 11, wherein the plurality of the rendering servers that are associated with the relay apparatus hold respectively different rendering resources in the loading region.

14. The rendering system according to claim 11, wherein
the screen is the game screen for a predetermined game and is rendered by using rendering resources that differ between scenes,
the information related to the rendering command includes information of a scene that corresponds to the game screen,
the plurality of the rendering servers that are associated with the relay apparatus are assigned in advance so that each performs rendering of different scenes of the game, and
the relay apparatus transmits the transmission destination information and the information related to the rendering command to the rendering server after referring to the information of the scene included in the information related to the rendering command.

15. A non-transitory computer-readable storage medium recording a program for causing one or more computers to function as the rendering system according to claim 11.

16. A control method of a rendering system, the rendering system including a command server and rendering servers, the command server, based on information received from a target client terminal, outputting information related to a rendering command for a screen, the rendering servers having storages for storing rendering resources used to render the screen, performing rendering of the screen in accordance with the information related to the rendering command received from the command server, and transmitting the screen to the target client terminal, the control method comprising:

receiving, by the command server, a screen transmission request from the target client terminal;

generating, by the command server, the information related to the rendering command by executing calculation processing related to the screen to be provided to the target client terminal;

outputting, by the command server, transmission destination information that indicates the target client terminal, which is a transmission destination of the screen and the information related to the rendering command, to, out of a plurality of the rendering servers which are associated with the command server, a rendering server that has loaded at least some of rendering resources necessary when performing rendering of the screen in accordance with the information related to the rendering command;

by the rendering server, reading, from a storage, loading into a loading region, and holding a rendering resource, out of necessary rendering resources, that is not yet loaded, based on the information related to the rendering command;

performing, by the rendering server using the rendering resource held in the loading region, rendering of the screen based on the information related to the rendering command; and transmitting, by the rendering server, the screen to the target client terminal based on the transmission destination information, wherein the screen transmission request is based on an operation input of the target client terminal that is reflected in the screen that is rendered by the rendering server in response to the screen transmission request, and the screen transmission request is received by the command server in a process during which the command server repeatedly performs the receiving, the generating, and the outputting in accordance with frame updates of a game screen.

17. A control method of a rendering system, the rendering system including a command server, rendering servers, and a relay apparatus, the command server, based on information received from a target client terminal, outputting information related to a rendering command for a screen, the rendering servers having storages for storing rendering resources used to render a screen, performing rendering of the screen in accordance with the information related to the rendering command, and transmitting the screen to the target client terminal, the relay apparatus transmitting to the rendering servers the information related to the rendering command, received from the command server, the control method comprising:

receiving, by the command server, a screen transmission request from the target client terminal;

generating, by the command server, the information related to the rendering command by executing calculation processing related to the screen to be provided to the target client terminal;

specifying, by the command server, a region in which the target client terminal is present;

outputting, by the command server, transmission destination information that indicates the target client terminal, which is a transmission destination of the screen, and the information related to the rendering command to the relay apparatus, which is present in a region corresponding to the region in which the target client terminal is present, receiving, by the relay apparatus, the transmission destination information and the information related to the rendering command;

transmitting, by the relay apparatus with referring to the information related to the rendering command, the transmission destination information and the information related to the rendering command to, out of a plurality of the rendering servers which are associated with the relay apparatus, a rendering server that has loaded at least some of the rendering resources necessary when performing rendering of the screen in accordance with the rendering command;

by the rendering server, reading from the storage, loading into a loading region, and holding a rendering resource, out of necessary rendering resources, that is not yet loaded, based on the information related to the rendering command;

performing, by the rendering server using the rendering resource held in the loading region, rendering of the screen based on the information related to the rendering command; and transmitting the screen to the target client terminal based on the transmission destination information, wherein the screen transmission request is based on an operation input of the target client terminal that is reflected in the screen that is rendered by the rendering server in response to the screen transmission request, and the screen transmission request is received by the command server in a process during which the command server repeatedly performs the receiving, the generating, the specifying, and the outputting in accordance with frame updates of a game screen.

* * * * *